(12) United States Patent
Kustrowski et al.

(10) Patent No.: US 9,636,661 B2
(45) Date of Patent: May 2, 2017

(54) METHOD FOR OBTAINING OXIDE CATALYSTS ON THE BASE OF EXFOLIATED LAYERED ALUMINOSILICATES

(71) Applicant: UNIWERSYTET JAGIELLONSKI, Cracow (PL)

(72) Inventors: Piotr Kustrowski, Cracow (PL); Piotr Natkanski, Skarzysko-Kamienna (PL); Anna Bialas, Cracow (PL); Paula Janus, Niepolomice (PL)

(73) Assignee: UNIWERSYTET JAGIELLONSKI, Cracow (PL)

( * ) Notice: Subject to any disclaimer, the term of this patent is extended or adjusted under 35 U.S.C. 154(b) by 359 days.

(21) Appl. No.: 14/398,791

(22) PCT Filed: May 2, 2013

(86) PCT No.: PCT/PL2013/000060
§ 371 (c)(1),
(2) Date: Nov. 4, 2014

(87) PCT Pub. No.: WO2013/169126
PCT Pub. Date: Nov. 14, 2013

(65) Prior Publication Data
US 2015/0133288 A1    May 14, 2015

(30) Foreign Application Priority Data

May 9, 2012    (PL) .......................................... 399122

(51) Int. Cl.
*B01J 21/16*    (2006.01)
*B01J 23/745*    (2006.01)
(Continued)

(52) U.S. Cl.
CPC ............. *B01J 23/745* (2013.01); *B01J 21/16* (2013.01); *B01J 23/72* (2013.01); *B01J 35/002* (2013.01);
(Continued)

(58) Field of Classification Search
CPC . B01J 23/745; B01J 37/14; B01J 21/16; B01J 23/72; B01J 37/0036; B01J 37/0201; B01J 35/002; C01B 39/026
(Continued)

(56) References Cited

U.S. PATENT DOCUMENTS 4,176,090 A    11/1979    Lussier et al.
4,845,066 A    7/1989    Fahey et al.
(Continued)

FOREIGN PATENT DOCUMENTS

WO    2008146065 A1    12/2008
WO    2009066942 A2    5/2009

OTHER PUBLICATIONS

Qiu et al. "Polyacrylate/(carboxymethylcellulose modified montmorillonite) superabsorbent nanocomposite: Preparation and water absorbency" vol. 107, Issue 1, pp. 118-123, Sep. 12, 2007.*
(Continued)

*Primary Examiner* — Colleen Dunn
*Assistant Examiner* — Haytham Soliman
(74) *Attorney, Agent, or Firm* — Walker & Jocke Co., LPA

(57) ABSTRACT

The present invention relates to the method of synthesising large-area oxide catalysts on the base of exfoliated layered aluminosilicates. As layered aluminosilicate are used bentonite, montmorillonite, nontronite and saponite.

19 Claims, 2 Drawing Sheets

(51) Int. Cl.
*C01B 39/02* (2006.01)
*B01J 23/72* (2006.01)
*B01J 35/00* (2006.01)
*B01J 37/00* (2006.01)
*B01J 37/02* (2006.01)
*B01J 37/14* (2006.01)

(52) U.S. Cl.
CPC ....... *B01J 37/0036* (2013.01); *B01J 37/0201* (2013.01); *B01J 37/14* (2013.01); *C01B 39/026* (2013.01)

(58) Field of Classification Search
USPC .................................. 502/74, 84; 252/378 P
See application file for complete search history.

(56) References Cited

U.S. PATENT DOCUMENTS

| | | |
|---|---|---|
| 2010/0239672 A1 | 9/2010 | Kemeny et al. |
| 2011/0033695 A1 | 2/2011 | Kim et al. |

OTHER PUBLICATIONS

Silva et al., "The effect of addition of acrylic acid and thioglycolic acid on the nanostructure and thermal stability of PMMAmontmorillonite nanocomposites", Applied Clay Science, vol. 47, No. 3-4, Jan. 4, 2010, pp. 414-420, XP026885482, Elsevier Science, NL ISSN: 0169-1317.

Kasgoz et al., "Enhanced Swelling and Adsorption Properties of AAm-AMPSNa/Clay Hydrogel Nanocomposites for Heavy Metal Ion Removal", Polym. Adv. Technol., vol. 19, Oct. 12, 2007, pp. 213-220, XP002713367.

Janovak et al., "Swelling properties of copolymer hydrogels in the presence of montmorillonite and alkylammonium montmorillonite", Applied Clay Science, vol. 43, No. 2, Aug. 23, 2008, pp. 260-270, XP025880880, Elsevier Science, NL ISSN: 0169-1317.

Uthirakumar et al., "Preparation and characterization of exfoliated polystyrene/clay nanocomposites using a cationic radical initiator-MMT hybrid", European Polymer Journal, vol. 41, No. 2, Nov. 21, 2004, pp. 211-217, XP027696110, Pergamon Press Ltd. Oxford, GB ISSN: 0014-3057.

Bonnefond et al., "Kinetics of the emulsion copolymerization of MMA/BA in the presence of sodium montmorillonite", Applied Clay Science, vol. 51, No. 1-2, Nov. 21, 2010, pp. 110-116, XP027581049, Elsevier Science, NL ISSN: 0169-1317.

International Search Report for App. No. PCT/PL2013/000060 filed May 2, 2013.

* cited by examiner

Table 1.

| Catalyst | Conversion of ethylbenzene [%] | Selectivity to styrene [%] |
|---|---|---|
| MMT kalc | 10.1 | 96.8 |
| MMTAAFe6% kalc | 57.3 | 96.8 |
| MMTAAFe10% kalc | 46.0 | 96.8 |
| MMTAAFe20% kalc | 44.7 | 95.5 |

Fig. 3.

METHOD FOR OBTAINING OXIDE CATALYSTS ON THE BASE OF EXFOLIATED LAYERED ALUMINOSILICATES

The invention relates to the method of synthesising large-area oxide catalysts on the base of exfoliated layered aluminosilicates, in which nanoscale metal oxide clusters are highly dispersed on the surface of exfoliated aluminosilicate material.

The known methods for modifying natural layered aluminosilicates are based on the direct exchange of metal cations present in the interlayer space of the mineral or on introducing cationic surfactants, monomers or polymer chains. Materials obtained in this way possess a wide range of applications including in catalysis, adsorption and production of polymer-aluminosilicate composite materials.

Modifications of layered aluminosilicates for obtaining materials with catalytic properties were carried out as early as the first half of the 20th century with the aim of obtaining active catalysts for hydrocarbon cracking. The first attempts to obtain catalysts consisted of removing alkali metal cations, which lower the catalytic activity, from the interlayer space of the mineral by acid treatment [A. Mills, J. Holmes, E E Cornelius, *Acid Activation of Some Bentonite Clays, J. Colloid Chem Phys.* 54 (1950) 1170-1185].

Further studies included developing a specific surface area of aluminosilicates in order to increase the exposure of active sites. Modifications were based on the introduction into the interlayer space of surfactants making up micelles and/or on intercalation of metal oligocations (e.g. Ti, Zr, Al, Fe).

Calcination of precursors received in that way resulted in obtaining so called supporting layer materials, in which the formed oxide clusters created a kind of interlayer pillars maintaining a stable layer structure- and causing a significant increase in the specific surface area [L. Chmielarz, B. Gil, P. Kustrowski, Z. Piwowarska, B. Dudek, M Michalik, *Montmorillonite Based Porous Clay Heterostructures (PCHS) Intercalated with Silica-titania Pillars—Synthesis and Characterization, J. Solid State Chem.* 182 (2009) 1094-1104, S D Bodman, W R McWhinnie, V. Begon, I Suelves, M.-J. Lazaro, T. J. Morgan, A. A. Herod, R Kandiyoti, *Metal-ion Pillared Clays as Hydrocracking Catalysts (I): Catalyst Preparation and Assessment of Performance at Short Contact Times, Fuel* 81 (2002) 449-459, S. D. Bodman, W. R. McWhinnie, V. Begon, M. Millan, I. Suelves, M.-J. Lazaro, A. A. Herod, R. Kandiyoti, *Metal-ion Pillared Clays as Hydrocracking Catalysts (II): Effect of Contact Time on Products from Coal Extracts and Petroleum Distillation Residues, Fuel* 82 (2003) 2309-2321, U.S. Pat. No. 4,845,066, U.S. Pat. No. 4,176,090].

The introduction of transition metal cations (e.g., Cu, Fe, Ni) via ion exchange between the layers of aluminosilicate allowed for increasing the number of surface active sites thus activating the modified layered material in catalytic processes that require the presence of redox centers needed, among others, for the removal of nitrogen oxides from the flue gases (DeNOx process), catalytic cracking (hydrocracking) of hydrocarbons, oxidation of phenol and aromatic compounds under mild pressure and temperature conditions [L. Chmielarz, P. Kustrowski, M. Zbroja, B. Gil-Knap, J. Datka, R. Dziembaj, *SCR of NO by $NH_3$ on Alumina or Titania Pillared Montmorillonite Modified with Cu or Co. Part II. Temperature Programmed Studies*].

A direct ion exchange of cations located in the interlayer spaces of natural mineral offers a significant simplification the method of synthesizing contact catalysts on the base of layered aluminosilicates described herein.

This method make it possible to form transition metal clusters which are catalytically active, but not easily accessible to the reagents (e.g., Cu) or metal oxides in the interlayer gallery [P. B. Malla, P. Ravindranathan, S. Komarneni, R. Roy, *Intercalation of Copper Metal Clusters in Montmorillonite, Nature* 351 (1991) 555-557, G.-W. Wang, Q.-Q. Hao, Z.-Tie Liu, Z.-W. Liu, Fischer-*Tropsch Synthesis Over Co/Montmorillonite-Insights Into the Role of Interlayer Exchangeable Cations, Appl Catal. A-Gen.* 405 (2011) 45-54].

The available literature also acknowledges reports on modifications of aluminosilicate materials with the use of hydrogel polymers. Polymer-aluminosilicate nanocomposites obtained in this way were tested thus far mainly as materials for adsorption applications [H. Kasgdz, A. Durmus, A. Kasgdz, *Enhanced Swelling and Adsorption Properties of AAm-AMPSNa/Clay Hydrogel Nanocomposites for Heavy Metal Ion Removal, Polym. Adv. Technol.* 19 (2008) 213-22].

BRIEF DESCRIPTION OF THE DRAWINGS

FIG. 3 shows a summary of the values of catalytic parameters set at the temperature of 650° C.

Brief Description

Figure 1:
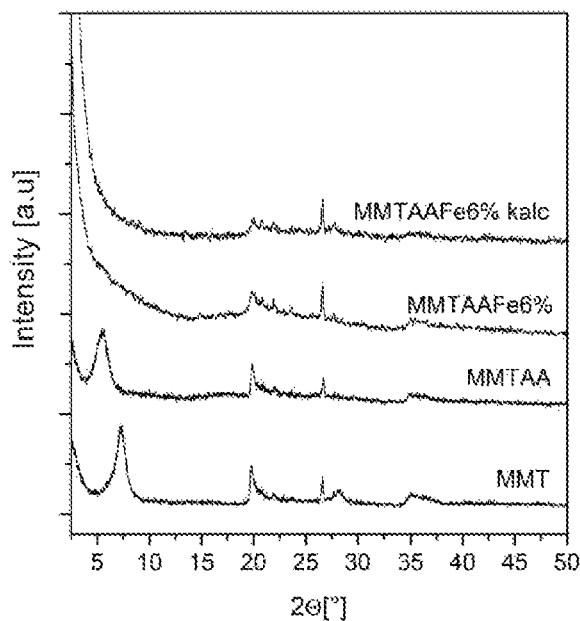
FIG. 1 shows a set of diffraction images recorded for the formulation at various stages of the synthesis.

There is no known work which would present possibilities for using hydrogel-aluminosilicate nanocomposites as precursors of oxide systems obtained by controlled sorption of metal cations combined with thermal post-treatment.

The method for obtaining oxide catalysts on the base of exfoliated layered aluminosilicate according to the invention is characterized in that at least one basic hydrophilic monomer is introduced into the interlayer space of the layered aluminosilicate in the amount of 30 wt %. to 90 wt %. relative to the mass of aluminosilicate, or with the addition of a hydrophilic crosslinking monomer in the amount of up to 20 wt % relative to the amount of the remaining monomers, and in situ polymerization is carried out in aqueous solution, then the resulting hybrid inorganic-organic layer material is submitted to sorption of at least one metal cation from the aqueous solution of its salt, followed by thermal treatment in the temperature range of 400-700° C., in an oxidizing atmosphere.

Bentonite, montmorillonite, nontronite and saponite are preferably used as layered aluminosilicate.

Preferably, the base monomer is a monomer containing in its molecular structure a polar hydrophilic group, such as carboxyl, hydroxyl, sulfo, amino, primary or secondary, most preferably selected from the group containing acrylic acid, methacrylic acid, acrylamide, N-vinylformamide, vinyl alcohol, 2-hydroxyethyl methacrylate.

As a crosslinking monomer a monomer is used which contains in the molecule more than one double bond, preferably N, N'-methylenebisacrylamide, ethylene glycol dimethacrylate, ethylene glycol diacrylate.

Preferably, the weight ratio of the basic monomer to the crosslinking monomer ranges from 1.0 to 4.0.

The process of in situ polymerization is preferably carried out with the addition of the initiator, at the temperature of 20 to 70° C. in an inert gas atmosphere. As the initiator ammonium persulfate, dihydrochloride 2,2'-azobis (2-methyl-propionamide) is preferably used.

Metal cation, which is introduced into the hybrid material obtained after the completion of the polymerization is a transition metal cation, preferably selected from the group containing Fe, Ni, Co, Cu, Mo, Zn, Cr, Mn. As the metal salt, which is used in the adsorption stage, readily soluble nitrate or chloride salts of the above-mentioned metals are preferably used, such as $Fe(NO_3)_3 \cdot 9H_2O$, $FeCl_3 \cdot 6H_2O$, $Cu(NO_3)_2 \cdot 3H_2O$, $CuCl_2$, $Co(NO_3)_2 \cdot 6H_2O$, $CoCl_2$, $CoCl_2 \cdot 6H_2O$, $Ni(NO_3)_2 \cdot 6H_2O$, $NiCl_2 \cdot 6H_2O$, $NiCl_2$, $MoCl_2$, $Zn(NO_3)2 \cdot H_2O$, $Zn(NO_3)_2$, $ZnCl_2$, $Cr(NO_3)_3 \cdot 9H_2O$, $CrCl3 \cdot 6H_2O$, $Mn(NO_3)_2 \cdot 6H_2O$, $MnCl2 \cdot 4H_2O$.

The sorption stage is carried out in such a way that the hybrid inorganic-organic layer material obtained in the polymerization step a is dried at the temperature of 20 to 90° C., homogenized and milled in order to obtain the material in powder form. The nanocomposite powder is then suspended in a metal salt solution and is stirred in the suspension at the temperature of 20 to 80° C., for 1 to 96 h. The weight ratio of the nanocomposite to the metal salt in the solution is from 1.0 to 30.0.

The third stage, the heat treatment is carried out in the air atmosphere for 1 to 24 hours while increasing the temperature at the rate of 0.1 to 50° C./min.

The method according to the invention is a thermal modification of the hydrogel-aluminosilicate nanocomposite with adsorbed transition metal(s) cations. One significant difference from commercially-derived aluminosilicate polymer composites is the increase of the inorganic content to the range of 30-90% wt. The modification of the clayey material by the introduction of hydrogel chains to the interlayer space results in the improvement of its sorption capacity in relation to metal cations.

As a result of thermal treatment, the organic components are removed by burning and exfoliation of the layered structure with the creation of catalytic systems in the form of metal oxide deposited on an aluminosilicate substrate.

The new synthesis method allows for obtaining exfoliated aluminosilicate material, on whose surface are deposited nanoscale metal oxide clusters constituting additional active sites, significantly improving the catalytic properties of the material. The method removes restrictions of previously developed supporting techniques, which was limited to the introduction to the modified clayey material only metal oxides forming stable oligocations.

The obtained catalysts on the basis of hydrogel-aluminosilicate precursors are characterized by a more than 10-fold increase of the specific surface area in relation to the starting material, which allows, in theory, for exposure of maximum number of catalytically and adsorption active surface sites. Furthermore, the proposed synthesis method allows for obtaining a very wide range of oxide phases dispersed on an aluminosilicate carrier. Having at the disposal a hydrogel-aluminosilicate composite precursor makes it possible to modify it further in a controlled way by introducing any kind of cations or a mixture of metal cations into the interlayer space. Thus, it is possible to design catalytically active materials in many processes, in which oxide systems based on acid carriers can be used.

Sample catalytic reactions, in which the synthesized materials can be used are: dehydrogenation of hydrocarbons, removal of oxides by reduction with ammonia or hydrocarbons, oxidation of organic compounds. An additional advantage of the proposed innovation is the relatively low cost of synthesis, carried out in an aqueous solvent, without the necessity to use environmentally harmful surfactants.

The method according to the invention is illustrated in more detail in application examples.

EXAMPLE 1

Synthesis of hydrogel-aluminosilicate nanocomposite.

In a 250 ml glass reactor placed on a water bath and equipped with a mechanical stirrer and a thermometer, 200 ml of a solution is prepared containing 30 g of monomers (acrylic acid and N, N'-methylenebisacrylamide with a molar ratio of respectively 1/100) and 30 g of montmorillonite.

After starting the stirrer (1000 rpm) the bath temperature is set to 30° C. and the system is left for 24 hours until the swelling of montmorillonite in a monomer solution. Then, to the homogenous mixture an initiator (ammonium persulfate) is added in the amount of 1 mol % in relation to the monomers. Oxygen is removed from the reactor by bubbling an inert gas (argon) for 10 minutes. After this time, the contents of the reactor are stirred at the speed of 400 rpm at the temperature of 60° C. to form a cross-linked gel composite. The resulting product is ground using a homogenizer, and then allowed to dry in an oven at the temperature of 60° C. The dry product is milled in a ball mill to obtain powder. The implementation of the proposed procedure for synthesis allows for obtaining approximately 60 g of nanocomposite at a time.

Modification of synthesized nanocomposite by introduction of Fe (III) cations.

In 250 ml single-neck round-bottom flask closed with a cork which is placed on a thermostated oil bath and equipped with a magnetic stirrer a composite suspension is formed in 0.01 M solution of $Fe(NO_3)_3 \cdot 9H_2O$ containing 2 g of composite and 0.461 g of nitrate nonahydrate (V) iron (III). The resulting suspension is stirred for 72 h at the temperature of 30° C. and at 400 rpm. The resulting rusty precipitate is filtered on a Buchner funnel, washed with a large amount of distilled water and dried at the temperature of 60° C. for 4 h.

Calcination of nanocomposite.

Composite (2 g) is placed in a porcelain boat and subjected to calcination in a tube furnace in flowing air (2 L/min) at the temperature of 600° C. for 6 h with raising temperature at the rate of 1° C./min. After calcination, approximately 0.93 g of the sample remains. The dried material is moved to a polypropylene container and stored in an exsiccator.

EXAMPLE 2

Synthesis of hydrogel-aluminosilicate nanocomposite.

In a 250 ml glass reactor placed on a water bath and equipped with a mechanical stirrer and a thermometer, 200 ml of a solution is prepared containing 10 g of monomers (N-vinylformamide and N, N'-methylenebisacrylamide in a molar ratio of respectively 1/100) and 10 g of montmorillonite. After starting the stirrer (500 rpm) the bath temperature is set to 30° C. and the system is left for 24 hours until the swelling of montmorillonite in a monomer solution. Then, to the homogenous mixture a dihydrochloride 2,2'-azobis (2-methyl-propionamide) is added in the amount of 1 mol % in relation to the monomers. Oxygen is removed from the reactor by bubbling an inert gas (argon) for 10 minutes. After this time, the contents of the reactor are stirred the temperature of 60° C. to form a cross-linked gel composite.

The resulting product is ground using a homogenizer, and then allowed to dry in an oven at the temperature of 60° C. The dry product is milled in a ball mill to obtain powder. The implementation of the proposed procedure for synthesis allows for obtaining approximately 60 g of nanocomposite at a time.

Modification of synthesized nanocomposite by introduction of Cu (II) cations.

In 250 ml single-neck round-bottom flask closed with a cork which is placed on a thermostated oil bath and equipped with a magnetic stirrer a composite suspension is formed in 0.01 M solution of $Cu(NO_3)_3 \cdot 3H_2O$ containing 2 g of composite and 0.422 g of trihydrate nitrate (V) copper (II). The resulting suspension is stirred for 72 h at the temperature of 30° C. and at 400 rpm. The resulting deposit is filtered on a Buchner funnel, washed with a large amount of distilled water and dried at the temperature of 60° C. for 4 h.

Calcination of nanocomposite.

Composite (2 g) is placed in a porcelain boat and subjected to calcination in a tube furnace in flowing air (2 L/min) at the temperature of 600° C. for 8 h with raising temperature at the rate of 0.5° C./min. After calcination, approximately 0.95 g of the sample remains. The dried material is moved to a polypropylene container and stored in an exsiccator.

EXAMPLE 3

The process of structural evolution of the starting layered aluminosilicate was examined with the use of powder diffraction method (XRD) as exemplified by the catalyst obtained according to Example 1.

FIG. 1 demonstrates a set of diffraction images recorded for the formulation at various stages of the synthesis: starting montmorillonite (MMT), montmorillonite after intercalation of hydrogel (MMTAA), montmorillonite after intercalation of hydrogel and sorption of ions Fe (III) (MMTAAFe6%) and modified montmorillonite after the final thermal treatment (MMTAAFe6% kalc).

In the case of natural montmorillonite the reflex (001) in the diffraction picture occurring at position 2θ amounting to 7.04° indicates a layered ordering of the material, in which the interlayer distance is 1.25 nm. After introducing the hydrogel modifier a shift of the discussed diffraction peak is observed towards lower angulation of 2θ, which indicates an increase in the interlayer distance to about 1.69 nm. This effect clearly demonstrates a successful intercalation of polymer chains into the interlayer space of the montmorillonite. After sorption of ions Fe (III) no distinct reflex (001) is observed. A broad peak occurring at the angle values of 2θ below 13° suggests a partial exfoliation of the modified aluminosilicate. The calcined product does not show the presence of the discussed maximum, which clearly indicates a full dissection of the material. Furthermore, the lack of reflections characteristic of oxide phases formed by iron compounds give evidence of a high degree of $Fe_2O_3$ dispersion on the surface of exfoliated aluminosilicate material.

Textural properties of the obtained oxide catalyst (MMTAAFe6% kalc) were tested using the low-temperature nitrogen sorption method.

For comparison purposes, an analogous measurement was made for the MMTFe_ref preparation obtained using conventional ion exchange of cations present in the interlayer space of Wyoming montmorillonite the Fe (III) ions.

Using the ion exchange method an identical amount of a transition metal was introduced, as in the case of the sample obtained with the method described in Example 1.

Figure 2:
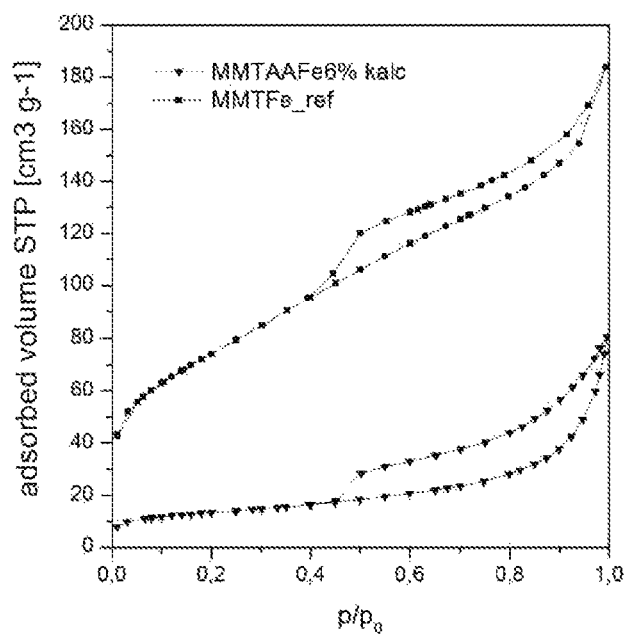
FIG. 2 shows the compiled adsorption-desorption nitrogen isotherms registered at the temperature of 77 K for the oxide catalyst (MMTAAFe6% kale) and the reference material.

The compiled adsorption-desorption nitrogen isotherms registered at the temperature of 77 K for the oxide catalyst (MMTAAFe6% kalc) and the reference material shown in FIG. 2 prove that the use of the method according to the invention for obtaining a catalyst on the base of exfoliated layered aluminosilicates allows for giving it a porous quality. The classic path of montmorillonite modification using ion exchange leads to obtaining material with a small surface development, which is 45 m/g as calculated according to the BET model. For the MMTAAFe6% kalc preparation the analogous surface development value is 265 $m^2/g$.

EXAMPLE 4

The synthesized materials on the basis of nanocomposites containing 6, 10 and 20 wt %. iron, as well as unmodified montmorillonite used as starting material for further modifications were tested in terms of their potential use in catalytic hydrocarbon conversion processes on the example of the dehydrogenation reaction of ethylbenzene to styrene. The tests were conducted in a quartz flow microreactor in an oxygen-free atmosphere (0.05 g of catalyst, total reactant flow rate 50 ml/min, content of ethylbenzene steam in He −0.1% vol.). The influence of iron content on the degree of conversion of ethylbenzene to styrene and selectivity of reaction involved was tested. FIG. 3 summarizes the values of catalytic parameters set at the temperature of 650° C.

The invention claimed is:

1. The method for obtaining oxide catalysts on the base of exfoliated layered aluminosilicates, comprising: wherein metal cations are introduced into the structure of the aluminosilicates such that at least one basic hydrophilic monomer is introduced to an interlayer space of layered aluminosilicate in the amount of 30% wt. to 90% wt. relative to the weight of aluminosilicate, or with the addition of a hydrophilic crosslinking monomer in the amount of up to 20 wt %. relative to the amount of the remaining basic hydrophilic monomer, and in situ polymerization is carried out in aqueous solution, then a resulting hybrid inorganic-organic layer material is submitted to sorption of at least one metal cation from the aqueous solution of its salt, followed by thermal treatment in the temperature range of 400-700° C., in an oxidizing atmosphere.

2. The method according to claim 1, wherein bentonite, montmorillonite, nontronite and saponite are used as layered aluminosilicate.

3. The method according to claim 1, wherein the base monomer is a monomer containing a polar hydrophilic group.

4. The method according to claim 3, wherein the polar hydrophilic group is a carboxyl, hydroxyl, sulfo, amino, primary or secondary amine group.

5. The method according to claim 1, wherein the basic monomer is selected from the group containing acrylic acid, methacrylic acid, acrylamide, N-vinylformamide, vinyl alcohol, 2-hydroxyethyl methacrylate.

6. The method according to claim 1, wherein as a crosslinking monomer a monomer is used which contains in the molecule more than one double bond.

7. The method according to claim 1, wherein the crosslinking monomer is selected from the group containing N,N'-methylenebisacrylamide, ethylene glycol dimethacrylate, ethylene glycol diacrylate.

8. The method according to claim 1, wherein the weight ratio of the basic monomer to crosslinking monomer ranges from 1.0 to 4.0.

9. The method according to claim 1, wherein the polymerization process is carried out at the temperature of 20 to 70° C. in an inert gas atmosphere.

10. The method according to claim 1, wherein the polymerization process is carried out with the addition of an initiator.

11. The method according to claim 10, wherein as the initiator ammonium persulfate, dihydrochloride 2,2'-azobis (2-methyl-propionamide) is used.

12. The method according to claim 1, wherein the metal cation is a transition metal cation.

13. The method according to claim 1, wherein the metal cation is selected from the group containing Fe, Ni, Co, Cu, Mo, Zn, Cr, Mn.

14. The method according to claim 1, wherein the metal salt nitrate or chloride salts are used.

15. The method according to claim 1, wherein the metal salt is selected from the group containing: $Fe(NO_3)_3.9H_2O$, $FeCl_3.6H_2O$, $Cu(NO_3)_2.3H_2O$, $CuCl_2$, $Co(NO_3)_2.6H_2O$, $CoCl_2$, $CoCl_2.6H_2O$, $Ni(NO_3)_2.6H_2O$, $NiCl_2.6H_2O$, $NiCl_2$, $MoCl_2$, $Zn(NO_3)_2.H_2O$, $Zn(NO_3)_2$, $ZnCl_2$, $Cr(NO_3).9H_2O$, $CrCl_3.6H_2O$, $Mn(NO_3)_2.6H_2O$, $MnCl_2.4H_2O$.

16. The method according to claim 1, wherein sorption stage is carried out in such a way that the hybrid inorganic-organic layer material obtained in the polymerization step a is dried at the temperature of 20 to 90° C., homogenized and milled, then an obtained nanocomposite powder is suspended in a metal salt solution and is stirred in the suspension at the temperature of 20 to 80° C., for 1 to 96 h.

17. The method according to claim 16, wherein the weight ratio of the nanocomposite to the metal salt in the solution is from 1.0 to 30.0.

18. The method according to claim 1, wherein the heat treatment is carried out in an air atmosphere for 1 to 24 hours.

19. The method according to claim 1, wherein the thermal treatment is done by raising temperature at the rate of 0.1 to 50° C./min.

* * * * *